United States Patent
Ooi et al.

(10) Patent No.: US 12,468,335 B2
(45) Date of Patent: Nov. 11, 2025

(54) INFORMATION HANDLING SYSTEM PERIPHERAL TEXT-TO- SPEECH SOLUTION WITH AUTOMATIC VOLUME ATTENUATION

(71) Applicant: Dell Products L.P., Round Rock, TX (US)

(72) Inventors: Ghee Beng Ooi, Singapore (SG); Jin Shiong Koh, Singapore (SG); Hsing-Hsien Wang, Taoyuan (TW)

(73) Assignee: Dell Products L.P., Round Rock, TX (US)

( * ) Notice: Subject to any disclaimer, the term of this patent is extended or adjusted under 35 U.S.C. 154(b) by 572 days.

(21) Appl. No.: 17/868,337

(22) Filed: Jul. 19, 2022

(65) Prior Publication Data

US 2024/0028071 A1   Jan. 25, 2024

(51) Int. Cl.
| | |
|---|---|
| *G06F 1/16* | (2006.01) |
| *G06F 3/16* | (2006.01) |
| *G10L 13/10* | (2013.01) |
| *H04R 3/04* | (2006.01) |

(52) U.S. Cl.
CPC .............. *G06F 1/1605* (2013.01); *G06F 3/16* (2013.01); *G10L 13/10* (2013.01); *H04R 3/04* (2013.01); *H04R 2430/01* (2013.01)

(58) Field of Classification Search
CPC .......... G06F 1/1605; G06F 3/16; G06F 3/165; G10L 13/10; G10L 13/00; H04R 3/04; H04R 2430/01
See application file for complete search history.

(56) References Cited

U.S. PATENT DOCUMENTS

| | | | |
|---|---|---|---|
| 7,315,818 B2 | 1/2008 | Stevens et al. | |
| 9,111,545 B2 | 8/2015 | Jadhav et al. | |
| 10,089,070 B1 | 10/2018 | Kanjariya et al. | |
| 2008/0045199 A1* | 2/2008 | Lee .......................... | G10L 13/00 455/414.4 |
| 2016/0269973 A1* | 9/2016 | Miyamoto .............. | H04W 4/80 |
| 2019/0172166 A1 | 6/2019 | Evans | |
| 2020/0135052 A1* | 4/2020 | Singh ....................... | A63F 13/52 |

(Continued)

OTHER PUBLICATIONS

Dell, "Dell Ultrasharp U4021QW Monitor Review," downloaded from https://www.rtings.com/monitor/reviews/dell/ultrasharp-u4021qw on Feb. 13, 2023, 27 pages.

(Continued)

*Primary Examiner* — Linda Wong
(74) *Attorney, Agent, or Firm* — Zagorin Cave LLP; Robert W. Holland (57) ABSTRACT

An accessibility device interfaces with a display through a cable to accept display onscreen menu items for presentation as speech from the accessibility device. For instance, a scalar of the display detects an interface with an external accessibility device and an end user interaction with an onscreen display and, in response, commands onscreen items as audible sounds presented at a speaker of the accessibility device. When the display has integrated display speakers, the scalar adjusts any audible sounds presented by the display speakers to help ensure that the onscreen display menu items are presented with sufficient volume to be heard, such as by lower the volume or turning off the audible sounds presented from the display speakers.

15 Claims, 6 Drawing Sheets

(56) References Cited

U.S. PATENT DOCUMENTS

| | | | |
|---|---|---|---|
| 2021/0034321 A1* | 2/2021 | Kim | H04R 3/12 |
| 2023/0214169 A1* | 7/2023 | Lin | G06F 3/165 |
| | | | 381/58 |
| 2023/0409516 A1* | 12/2023 | Wu | G10L 13/00 |

OTHER PUBLICATIONS

Dell, "Support for Dell P2722H," downloaded from https://www.dell.com/support/home/en-us/product-support/product/dell-p2722h-monitor/docs on Feb. 13, 2023, 4 pages.

Dell, "Support for Dell P2422HA," downloaded from https://www.dell.com/support/home/en-us/product-support/product/p2422ha-monitor/docs on Feb. 13, 2023, 2 pages.

* cited by examiner

INFORMATION HANDLING SYSTEM PERIPHERAL TEXT-TO- SPEECH SOLUTION WITH AUTOMATIC VOLUME ATTENUATION

BACKGROUND OF THE INVENTION

Field of the Invention

The present invention relates in general to the field of information handling system accessibility, and more particularly to an information handling system peripheral text-to-speech solution with automatic volume attenuation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems integrate processing components and interface with a display and input devices to interact with end users. Generally, information handling systems have stationary housings, such as desktop and tower systems, or portable housings, such as convertible and tablet systems. Portable information handling systems allow end users to carry a system between meetings, during travel, and between home and office locations so that an end user has access to processing capabilities while mobile. Portable information handling systems typically integrate processing components, a display, a keyboard and a power source within a portable housing to support mobile use. In contrast, stationary systems rely on a fixed power source, such as an outlet, and peripheral devices, such as a separate keyboard and display interfaced by cables or a wireless protocol. Although portable systems have integrated input/out devices, in many instances portable systems are also used with peripheral input and output devices at fixed locations, such as through a docking station. Typically, peripheral devices couple to an information handling system with a cable or wireless interface so that the information handling system is available to aid the end user configuration of the peripheral devices, such as by providing instructions at the display regarding how to configure the peripheral devices. As long as the information handling system is interfaced with the peripheral device, instructions executing on the information handling system can aid the end user.

Recent laws and regulations have extended to the use of peripheral devices by disabled individuals. For example, the Communications and Video Accessibility Act (CVAA) includes a variety of requirements for accessibility of communications devices. For instance, CVAA (FCC-13-138) calls for a text-to-speech capability for information handling system displays to have accessibility of user interfaces and video programming guides and menus to aid visually impaired individuals. When a display is interfaced with an information handling system, an application executing on the information handling system can play audio to support the user interface. When a display is not interfaced with an information handling system, such functionality typically has to be included in the display itself. For example, a text-to-speech module coupled to the display has to support voice user interface output of the onscreen display menu when the display is not interfaced with an information handling system. The regulations specify that every type of device need not include an accessibility solution, however, the manufacturer has to have an accessibility solution available. Tracking inventory of a display type to separate those that include accessibility from those that do not, such as with separate SKU's, increases inventory management complexity. Including accessibility functionality in every display increases manufacture cost with little benefit since most end users will not need the functionality. Further, different displays may or may not include speakers and, when speakers are included, may have speakers of different types that are accessed by the information handling system during normal use and thus not available for accessibility functions.

SUMMARY OF THE INVENTION

Therefore, a need has arisen for a system and method which selectively interfaces with an information handling system peripheral to support accessibility functions.

In accordance with the present invention, a system and method are provided which substantially reduce the disadvantages and problems associated with previous methods and systems that interface with information handling system peripherals with accessibility devices. A display has an accessibility port that interfaces the display's scalar with a separate accessibility device through a cable. The scalar sends onscreen display menu items to the accessibility device for presentation as audible onscreen display menu items.

More specifically, an information handling system processes information with a processor and memory that cooperate to execute instructions and presents the information as visual images at a display. The display includes a scalar that presents an onscreen display menu for managing display operations, such as display port configurations, brightness, contrast, etc. When the onscreen display menu is operational, the scalar checks to see if an accessibility device is interfaced with the display through an accessibility device port and, if so, presents the onscreen display menu item as voice through the accessibility device. The scalar cooperates with an information handling system when present to select an optimal voice presentation and to adjust the volume of other audible presentations to ensure that the accessibility device can be heard. For example, the scalar turns down the volume of a display speaker when the accessibility device presents an onscreen display menu item. The accessibility device provides audible interface instructions for the display when an information handling system is not coupled to the display, such as instructions for connecting a cable between the display and information handling system.

The present invention provides a number of important technical advantages. One example of an important technical advantage is that an accessibility device interfaces with a display to provide audible presentation of onscreen display menu items to meet CVAA accessibility. A separate accessibility device to support audible presentation helps to meet CVAA requirements with a reduced cost by including the audible presentation capabilities in only those displays having the need. The audible onscreen display menu presentation is made in conjunction with a decrease in other audible output, such as by a display speaker included with the display to help ensure that the accessibility device speaker will be heard.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system display manages presentation of onscreen display menu items at an accessibility device as audible sounds. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
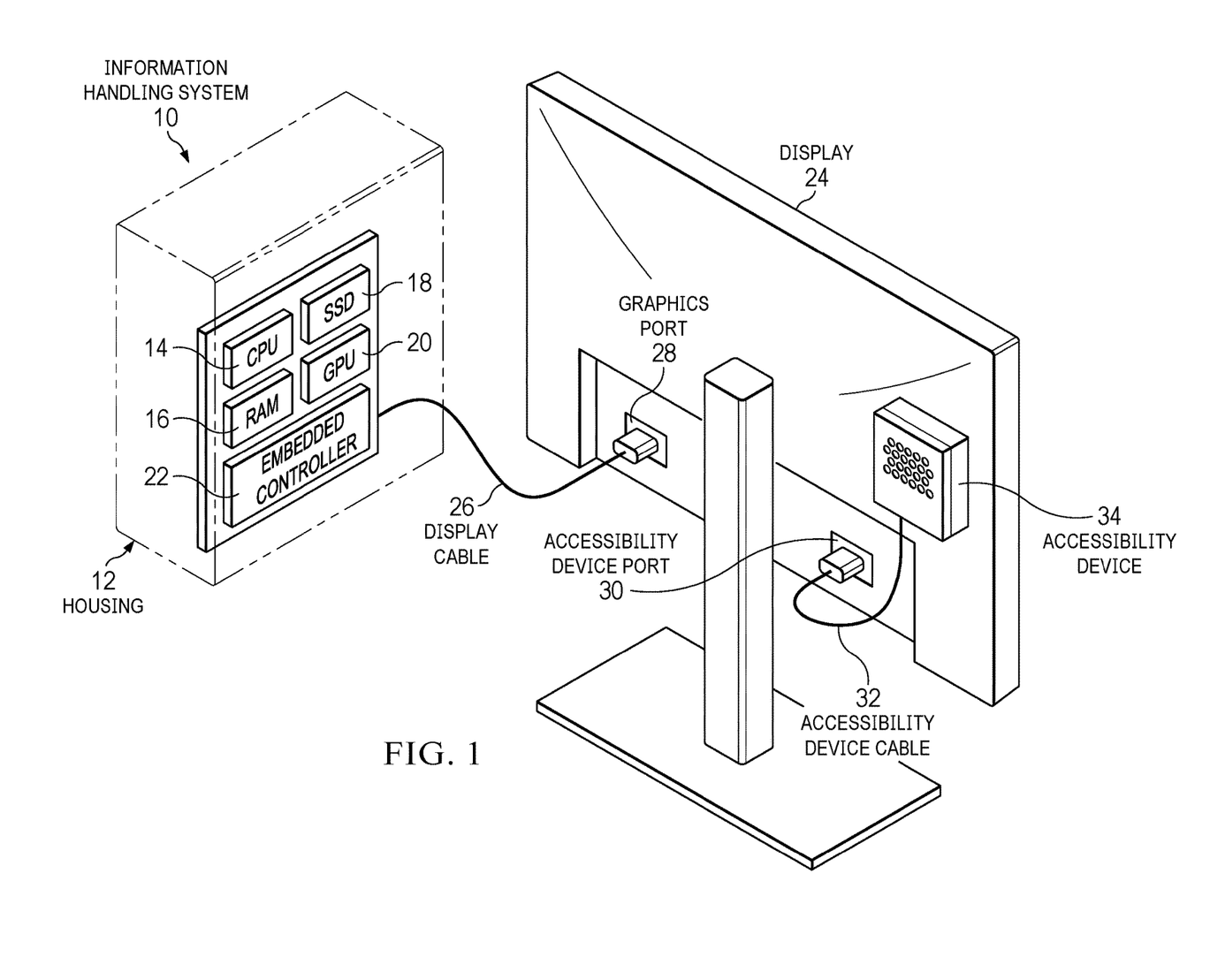
FIG. 1 depicts an information handling system interfaced with a display having an accessibility device that plays onscreen display menu times as audible sounds.

Referring now to FIG. 1, an information handling system 10 is depicted interfaced with a display 24 having an accessibility device 34 that plays onscreen display menu times as audible sounds. In the example embodiment, information handling system 10 processes information with processing components disposed in a housing 12 that cooperate to process information. For instance, a central processing unit (CPU) 14 executes instructions that process information in cooperation with a random access memory (RAM) 16 that stores the instructions and information. A solid state drive (SSD) 18 provides persistent storage of information, such as an operating system and applications that have instructions to execute on CPU 14. A graphics processor unit (GPU) 20 further processes the information to generate visual images for presentation at display 24, such as with pixel values that are communicated through a display cable 26 to a graphics port 28. An embedded controller 22 manages the processing components on a physical level, such as the application of power and maintenance of thermal constraints as well as interactions with peripheral devices like a keyboard, mouse and display.

Display 24 presents the visual images with a display panel, such as a liquid crystal display panel or an organic light emitting diode (OLED) film, exposed at a front face and includes graphics ports 28 at a rear face. An accessibility device port 30 accepts an accessibility device cable 32 that provides communication between a scalar of display 24 and an accessibility device 34. Accessibility device 34 receives text from a scalar of display 24 and transforms the text to speech for presentation at a speaker within accessibility device 34. For instance, when an end user interacts with an onscreen display menu of display 24, such as to configure the display resolution, color, contrast and other operating settings, the display scalar sends the onscreen menu items to accessibility device 34 to play as audible sounds. The audible onscreen display menu items are stored on the scalar as text strings that are communicated as text strings to accessibility device 34 for text-to-speech conversion to analog signals for playback by a speaker of accessibility device 34. Alternatively, the audible onscreen display menu items may be stored in the display or accessibility device already converted to speech and played on command as analog signals communicated to the speaker of accessibility device 34. Display 24 plays the onscreen display menu items from local memory when an information handling system is not connected so that accessibility is supported without support from an information handling system. In one alternative embodiment, the audible onscreen display menu items may be initiated at the display by interaction of an end user with a physical input button of the display and then played in cooperation with the information handling system, such as by sending the commands to the information handling system for the information handling system in turn to send the audible information to speakers associated with the display. When an information handling system is interfaced to display 24, it may also communicate through display 24 to perform maintenance of accessibility device 34, such as firmware updates. For instance, firmware updates received at information handling system 10 associated with display 24 that include support for accessibility device 34 are stored in the display scalar until accessibility device 34 is detected, at which time the firmware update is performed from the scalar.

In operation, the accessibility device supports audible presentation of onscreen display menu items, such as in support of CVAA (FCC-13-138). Out of the box, display 24 powers up without an information handling system and presents an onscreen display menu with logic and persistent memory of the display scalar. When accessibility by a visually impaired individual is desired, accessibility device 34 plugs into display 24 and reads out loud the text presented at the onscreen display menu as an end user interacts with the menu through controls of the display. For instance, the scalar sends text strings to the accessibility device when a brightness menu is selected so that the accessibility device converts the text strings to voice, such as "brightness, turn left to decrease and right to increase." When an information handling system interfaces with the display, the audible presentation of onscreen display menu items may continue from the accessibility device or may convert to information handling system logic using a speaker managed by the information handling system. For instance, as control inputs are made at the display, the scalar detects the presence of an information handling system and the accessibility device and sends the text string to the information handling system for conversion to speech when a speaker is available. The presentation of audible onscreen menu items by the information handling system versus the accessibility device is managed by the information handling system operating system audio and display drivers. When an information handling system is interfaced with the display but the onscreen display menu items are audibly presented by the accessibility device, the scalar, in addition to commanding the text string for presentation, commands an adjustment in the presentation of other audio so that the onscreen display menu item is presented with sufficient volume to be heard relative to other audio. For instance, when the display integrates or interfaces with speakers, the scalar commands a reduction of volume or turning off of volume from those speakers so the accessibility device speaker is heard. Similarly when the speaker is controlled by the information handling system, the scalar commands a reduction of the speaker volume at the information handling system during presentation of the audible onscreen display menu items by the accessibility device. In another alternative embodiment, accessibility device 34 offers a backup to present audible instructions when a primary information handling system accessibility system fails or is not available, such as by stating "no cable connected" or when a power off button is pressed.

Figure 2:
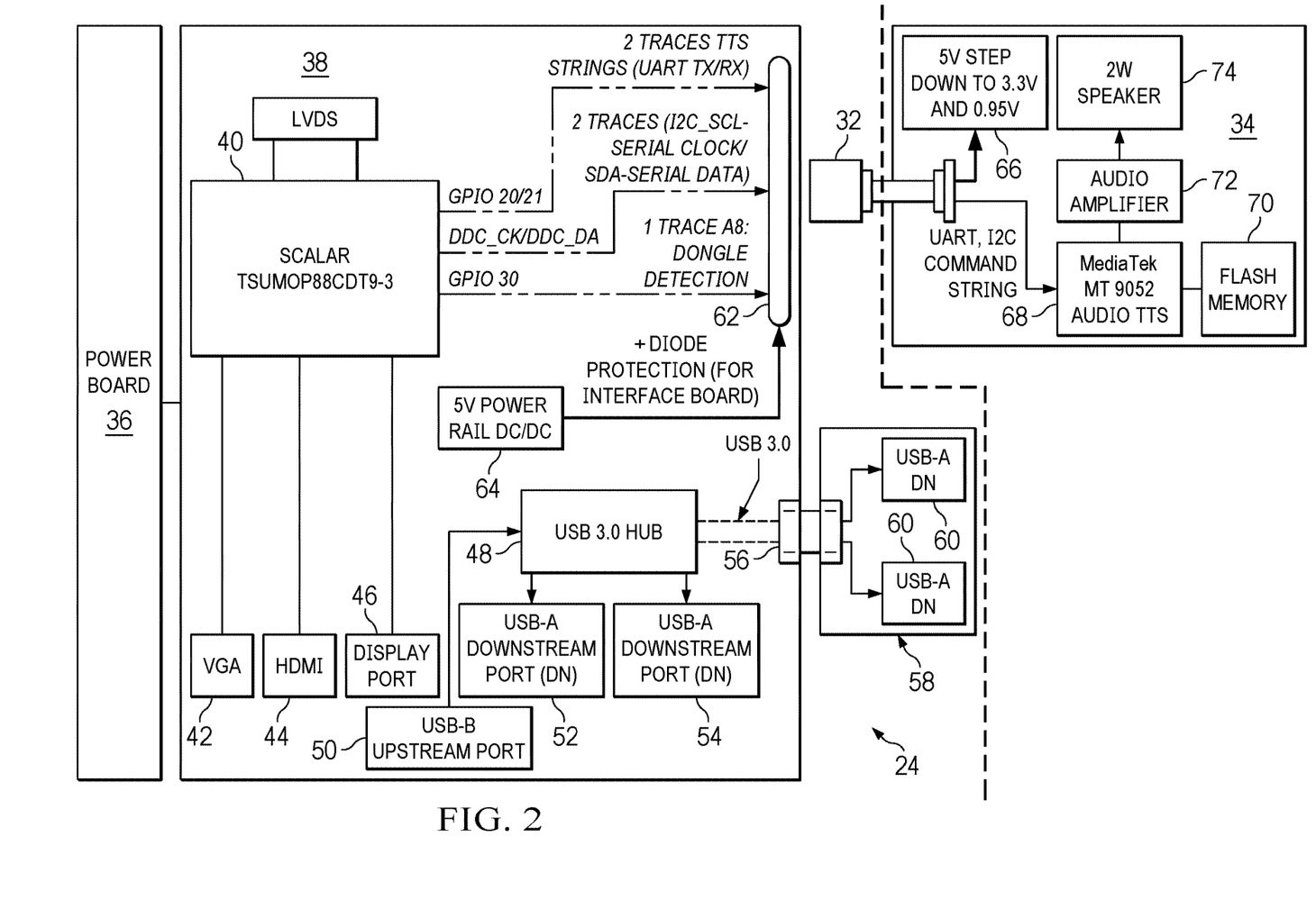
FIG. 2 depicts a block diagram of a display that presents an onscreen display menu as audible sounds at an accessibility device.

Referring now to FIG. 2, a block diagram depicts a display that presents an onscreen display menu as audible sounds at an accessibility device 34. The display has a power board 36 that provides power to an interface board 38. Interface board 38 supports a scalar 40 that outputs visual information for presentation at a display panel through an LVDS interface. In the example embodiment, scalar 40 is a Vishay Intertechnologies TSUMOP88CDT9-3 integrated circuit that accepts visual information from a GPU through a VGA port 42, and HDMI port 44 and a DisplayPort 46. A USB 3.0 Hub 48 included on interface board 38 supports a USB-B upstream port 50 that accepts information from an external source, such as an information handling system, to communicate the information to USB-A downstream ports 52 and 54, such as to support peripheral devices. A USB 3.0 link 56 supports a USB daughterboard 58 when additional USB-A ports 60 are desired. Scalar 40 includes plural pins that support interaction with an accessibility device 34. In the example embodiment, scalar 40 interfaces with an accessibility device port 62 through three GPIO pins and two clock pins (DDC_CK/DDC_DA). Two of the GPIO pins provide text communication, such as with UART TX/RX, and one pin supports detection of a cable coupled to accessibility device port 62. A five Volt power rail 64 provides a diode protected power source to accessibility device port 62. Although the example embodiment has a dedicated accessibility device port, an alternative embodiment may use a USB port to communicate the text information and power.

Accessibility device 34 has a dedicated accessibility device cable 32 that terminates with a connector sized to fit in the accessibility port 62. The five Volt power is communicated through a circuit power to a step down 66 that supports 3.3V and 0.95V to the other components of the accessibility device. The UART/I2C command string sent from scalar 40 is communicated to a text-to-speech resource 68, such as a MediaTek MT 9052 Audio TTS supported by a flash memory 70. The text is converted to analog speech signals that mimic voice, sent through an amplifier 72 and played at a 2 W speaker 74. The example embodiment converts text to speech in accessibility device 34, however, an alternative embodiment may send the voice analog signal from the display to play directly at speaker 74. As another alternative, the voice information may be saved locally in flash memory 70 from which it is retrieved by command from scalar 40. Various arrangements may be used based upon the capability of the display and the range of messages that are called for. For instance, if only a few error messages are to be played, such as a bad cable connection message and a power off message, a less complex accessibility device 34 may help to reduce costs.

Figure 3:
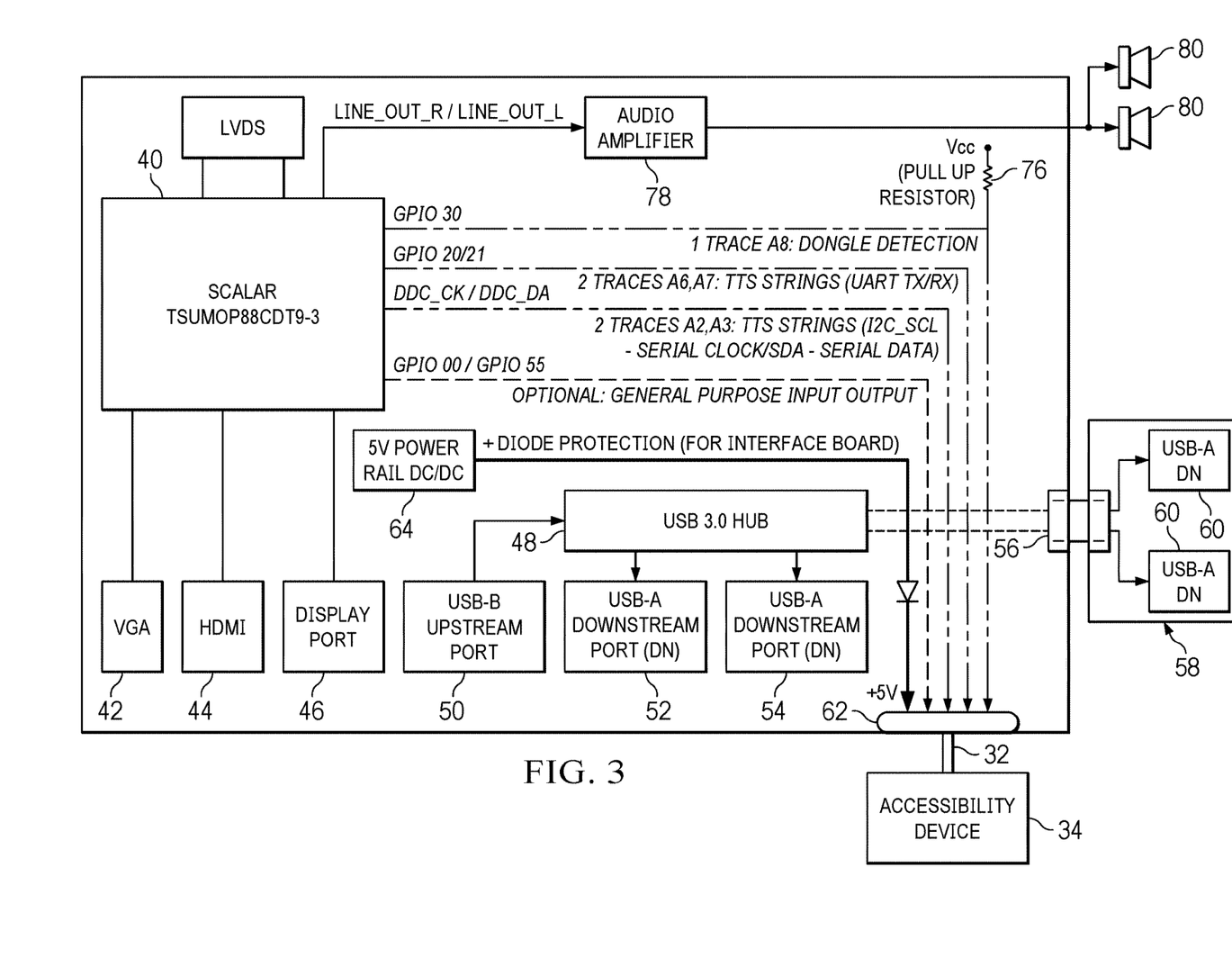
FIG. 3 depicts a block diagram of a display that presents an onscreen display menu as audible sounds at an accessibility device and manages audible sounds presented at integrated display speakers in cooperation with the accessibility device presentation of onscreen display menu items.

Referring now to FIG. 3, a block diagram depicts a display that presents an onscreen display menu as audible sounds at an accessibility device and manages audible sounds presented at integrated display speakers 80 in cooperation with the accessibility device 34 presentation of onscreen display menu items. The example embodiment has a similar configuration to that explained above with respect to FIG. 2 by providing accessibility device port 62 with UART data and a 5V power rail 64 input to provide text and power through accessibility device cable 32 to accessibility device 34. An additional GPIO interface is available to support optional features, such as an I2C interface. A pull up resistor 76 manages the detection signal high and low based upon whether an accessibility device cable 32 is coupled to accessibility device port 62. An audio amplifier 78 interfaces with an audio output of scalar 40 to provide an amplified output to speakers 80. Scalar 40 controls the volume output from speaker 80 by managing the output of audio amplifier 78. When audio is presented at speakers 80 and scalar 40 commands presentation of audible onscreen display menu items at accessibility device 34, scalar 40 adjusts the volume played at speakers 80 to ensure that audio is heard at accessibility device 34. For instance, the output of speakers 80 may be dropped below 2 W or turned off until the audible onscreen display menu item is played.

Figure 4:
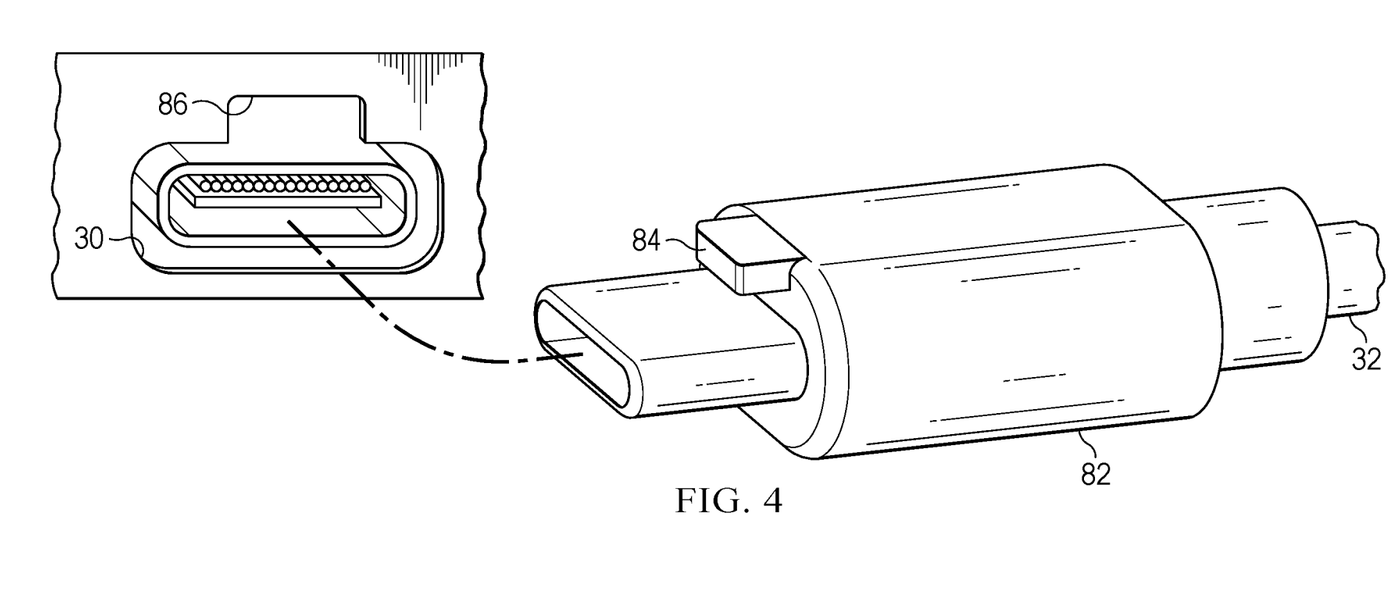
FIG. 4 depicts an example accessibility device port and connector.

Referring now to FIG. 4, an example is depicted of an accessibility device port 30 and connector 82. In the example embodiment, a standard Type-C USB port is modified with an extension 84 that fits into a cavity 86 to allow an interface of the pins. Connector 82 is prevented by extension 84 from inserting in a standard USB port. If a USB connector is inserted into accessibility device port 30, the power and ground pins are aligned to prevent damage, however, no functionality is available. In one alternative embodiment that prevents accessibility device port 30 from accepting a standard USB connector, an extension 84 extends out from the bottom side of the port to align with a cavity formed in the bottom side of the connector. This arrangement allows the use of standard USB hardware to support communication while preventing mix ups with standard USB devices that cannot fit into accessibility device port 30.

Figure 5:
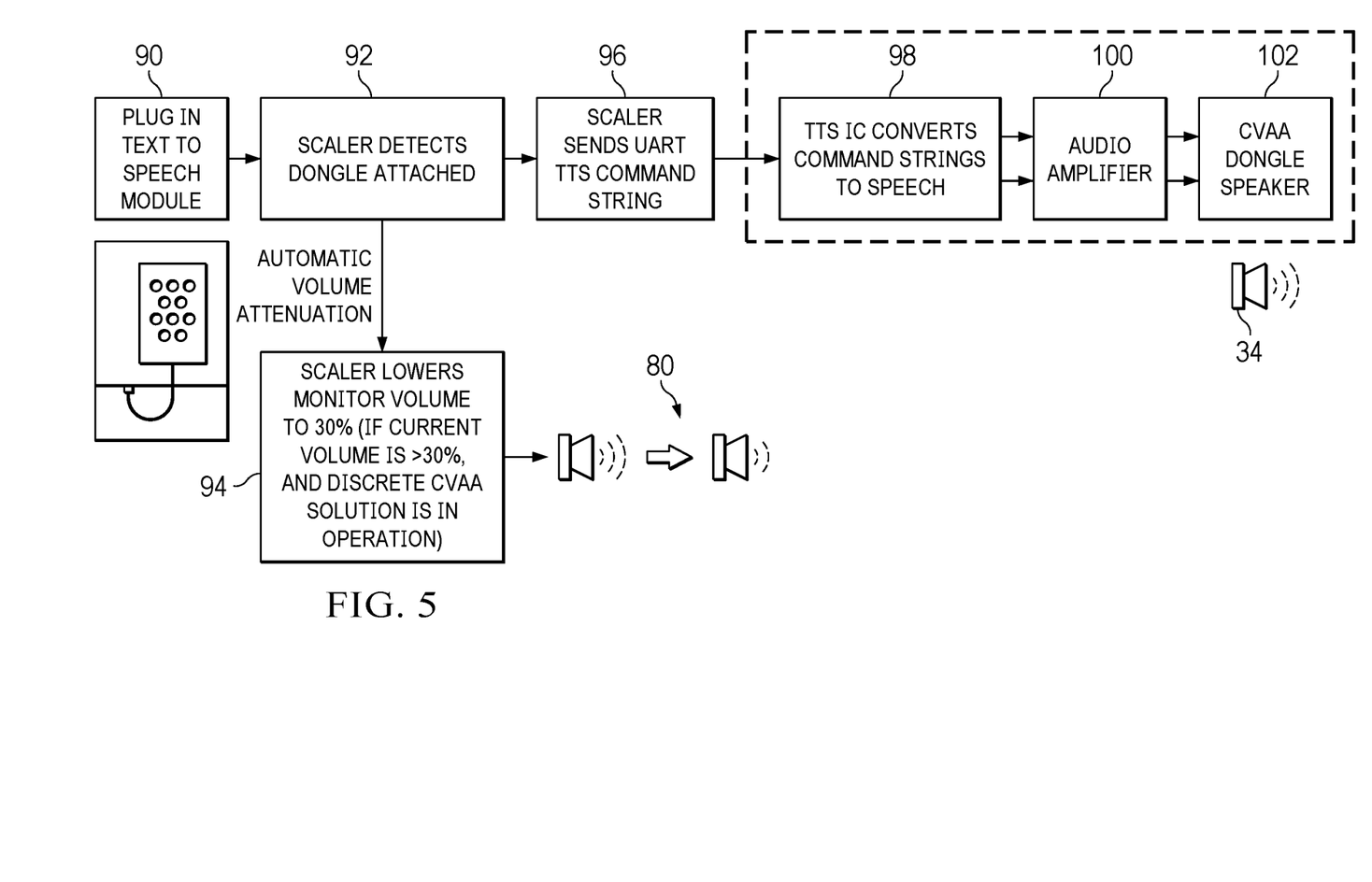
FIG. 5 depicts a flow diagram of a process for presentation of onscreen display menu items with audible sounds.

Referring now to FIG. 5, a flow diagram depicts a process for presentation of onscreen display menu items with audible sounds. The process starts at step 90 by plugging in the text to speech accessibility device to the display. At step 92, the display scalar detects the cable connection to the accessibility device port. At step 94, the scalar lowers the display speaker volume to ensure the accessibility device audio is heard, such as with a setting 30% of the maximum volume at display speakers 80. In one embodiment, the volume is decreased only with CVAA audio is operational. At step 96, the scalar sends a UART TTS command string to the accessibility device that includes the text for conversion to voice of the onscreen display menu item. At step 98, the text to speech resource of the accessibility device converts the text of the UART command string to speech. At step 100, the speech is provided to an amplifier and at step 102 played by the accessibility device 34 speaker.

Figure 6:
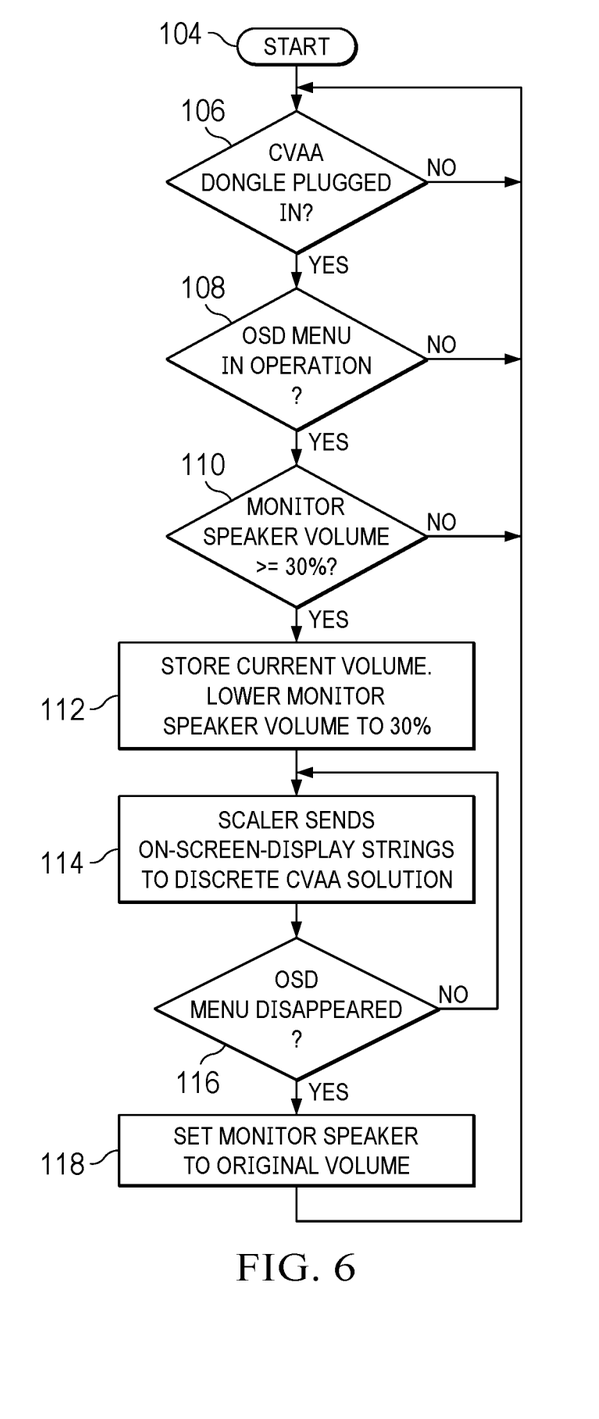
FIG. 6 depicts a flow diagram of a process for adjusting a display speaker presentation of audible sounds when an accessibility device presents an onscreen display menu item.

Referring now to FIG. 6, a flow diagram depicts a process for adjusting a display speaker presentation of audible sounds when an accessibility device presents an onscreen display menu item. The process starts at step 104 and determines at step 106 whether the accessibility device interfaces with the display to support CVAA text to voice presentation and, if not, returns to step 104. If the accessibility device is interfaced with the display, the process continues to step 108 to determine if the onscreen display menu is in operation and, if not, returns to step 104. When the onscreen display menu is active, the process continues to step 110 to determine if the display speaker has a volume set of greater than 30% of maximum volume. If the volume is too high, such as greater than 30% of maximum, the process can return to step 104 or, alternatively, command a decrease in the speaker volume. When the speaker volume is or can be set below the threshold defined by step 110, the process continues to step 112 to store the current volume and then lower the display speaker volume below the threshold, such as below 30%. At step 114, the scalar sends the onscreen display menu item, such as text strings of what is shown on the display, to the accessibility device to present the audible voice onscreen display menu items compliant with CVAA. At step 116, the audible presentation of the onscreen display menu is determined as complete when the onscreen display menu visual presentation is complete. Once the onscreen display menu has disappeared, the process continues to step 118 to set the display speaker to the original saved volume and the process returns to step 104 to continue monitoring for operation of the onscreen display menu.

Although the present invention has been described in detail, it should be understood that various changes, substitutions and alterations can be made hereto without departing from the spirit and scope of the invention as defined by the appended claims.

What is claimed is:

1. An information handling system comprising:
    a processor operable to execute instructions to process information;
    a memory interfaced with the processor and operable to store the instructions and information;
    a graphics processor interfaced with the processor and operable to further process information to define visual images for presentation at a display;
    a display interfaced with the graphics processor and operable to present the visual images, the display including a scalar supporting generation of visual images to present an onscreen display menu that manages display operations;
    a display speaker coupled to the display and operable to play audio information communicated from the processor as audible sounds; and
    an accessibility device separate from, external to and attachable/detachable at the display, the accessibility device interfaced with the scalar by a cable, the accessibility device having a speaker and a text to speech resource operable to output on screen display menu items communicated from the scalar through the cable as speech at the speaker, the scalar adjusting the display speaker audible sounds when the accessibility device outputs the onscreen menu items as speech, wherein the scalar adjusts the display speaker audible sounds to a volume of less than the volume at which the onscreen menu speech is output.

2. The information handling system of claim 1 wherein the scalar adjusts the display speaker audible sounds to off when the onscreen menu speech is output.

3. The information system of claim 1 wherein the onscreen menu items are communicated from the scalar through the cable via universal asynchronous receiver-transmitter (UART).

4. The information handling system of claim 1 wherein the onscreen menu items are communicated from the scalar to a text-to-speech integrated circuit (IC) of the accessibility device for translation to audible speech with the aid of a flash memory, the audible speech generated by the text-to-speech integrated circuit with retrieval of the menu items from the flash memory.

5. The information handling system of claim 4 wherein the scalar uploads the onscreen menu items to the accessibility device upon detecting an initial interface with the accessibility device.

6. The information handling system of claim 1 further comprising:
    an accessibility port exposed at the display and having a structure shaped to accept the accessibility device cable; and
    an accessibility cable coupled to the accessibility device and having a member extending out that fits into the accessibility port structure and interferes with insertion into other than the accessibility port.

7. The information handling system of claim 6 wherein:
    the accessibility port comprises a USB port having a cavity at one side; and
    the accessibility cable comprises a USB port having the member at one side sized to fit in the cavity.

8. A method for presenting onscreen menu items at a display, the method comprising:
    detecting with a scalar an onscreen menu input made at the display;
    communicating from the scalar through a cable to an external accessibility device audible information for the onscreen menu input;
    presenting the audible information as audible sounds at a speaker of the accessibility device;
    detecting presentation of audible information at speakers of the display; and
    adjusting the presentation of the audible information at the speakers of the display when the speaker of the accessibility device outputs the audible sounds, wherein the adjusting the presentation comprises lowering with the scalar the volume of the audible information presented at the speakers of the display.

9. The method of claim 8 wherein the adjusting the presentation comprises turning off with the scalar the volume of the audible information presented at the speakers of the display.

10. The method of claim 8 further comprising commanding the presentation of the onscreen menu audible information from the speakers of the display instead of the accessibility device.

11. The method of claim 8 further comprising:

detecting initiation of an interface between the display and the accessibility device; and in response to the detecting initiation, copying onscreen menu items to flash memory of the accessibility device for subsequent presentation as audible menu items.

12. The method of claim 11 further comprising:

in response to the detecting initiation, detecting that the display interfaces with an information handling system; and in response to the detecting that the display interfaces with the information handling system, copying an update of firmware of the accessibility device from the information handling system to the display and from the display to the accessibility device.

13. An accessibility device comprising:

a housing;

a speaker disposed in the housing and operable to present audio information as audible sounds;

a text to speech resource disposed in the housing and interfaced with the speaker, the text-to-speech resource operable to output audible onscreen display menu items communicated from a display as speech at the speaker;

a cable connected to the housing and interfaced with the text to speech resource, the cable terminating at a connector configured to couple to a display; and a scalar disposed in the display and interfaced with the cable through the connector, the scalar having instructions that command presentation at the speaker of the audible onscreen display menu items in response to an end user interaction with a visual onscreen display menu at the display, the scalar further commanding reduction of a volume of audible output from a display speaker of the display in response to the command of presentation of the audible onscreen display menu items at the speaker.

14. The accessibility device of claim 13 wherein the reduction of volume is a turning off of the display speaker with the onscreen display menu is presented.

15. The accessibility device of claim 13 wherein the scalar further presents the audible onscreen display menu at a display speaker instead of the accessibility device.

* * * * *

UNITED STATES PATENT AND TRADEMARK OFFICE
CERTIFICATE OF CORRECTION

| | |
|---|---|
| PATENT NO. | : 12,468,335 B2 |
| APPLICATION NO. | : 17/868337 |
| DATED | : November 11, 2025 |
| INVENTOR(S) | : Ghee Beng Ooi et al. |

Page 1 of 1

It is certified that error appears in the above-identified patent and that said Letters Patent is hereby corrected as shown below:

On the Title Page

In the Abstract, Line 12, please replace "lower" with --lowering--;

In the Claims

Column 8, Claim 3, Line 1, please replace "information system" with --information handling system--.

Signed and Sealed this
Ninth Day of December, 2025

John A. Squires
*Director of the United States Patent and Trademark Office*